Patented Oct. 8, 1946

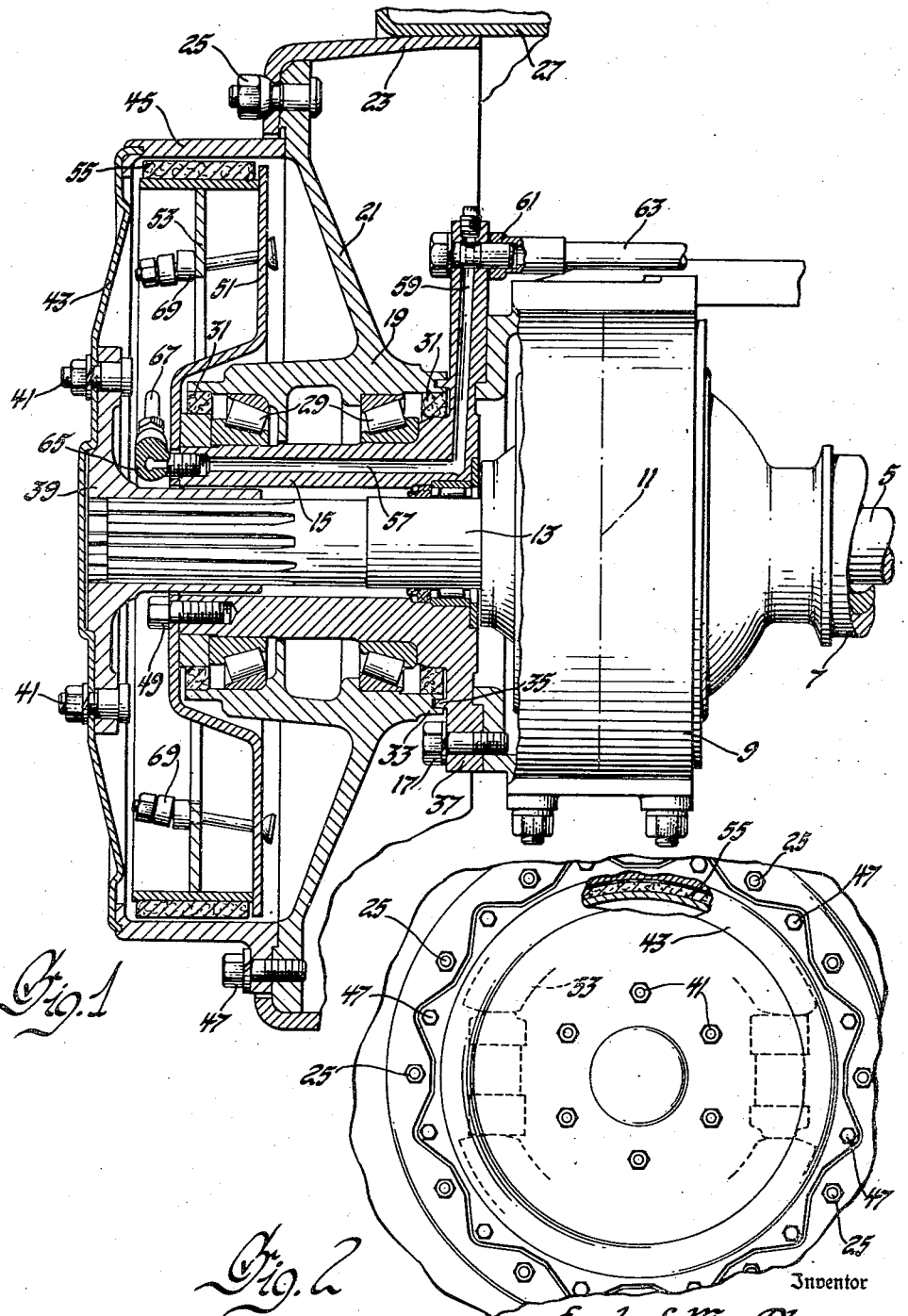

2,408,938

UNITED STATES PATENT OFFICE 2,408,938

WHEEL BRAKE

Earle S. MacPherson, Detroit, Mich., assignor to General Motors Corporation, Detroit, Mich., a corporation of Delaware Application July 2, 1945, Serial No. 602,718

4 Claims. (Cl. 188—152)

On vehicles as usually built, the brake drums are mounted on the inner side of the wheels and the drums are closed by a so-called anchor plate or backing plate which is mounted on the rear axle housing or on the front wheel steering knuckle as the case may be. The shoes are anchored on this anchor plate and are spread by suitable means, such as a cam or wheel cylinder carried by this plate to frictionally engage the drum. With this mounting it is necessary to remove the wheel when access is to be had to the brake shoe assembly carried by the backing plate. Also with this conventional arrangement, foreign matter is constantly getting into the drum enclosure through the space where the edge of the backing plate approaches the inner edge of the annular part of the drum.

The present invention has for its purpose to provide ready access to the parts within the drum enclosure without removing the supporting wheel. It also, to a very great extent, keeps the shoe assembly free from foreign matter. These objects are attained by the location of the drum on the outside of the wheel and by making use of an effective seal between the non-rotating part and the rotating wheel hub so that dirt can only reach the drum enclosure by passing through this seal and through the wheel bearings.

The invention is illustrated by the accompanying drawing in which:

Figure 1 is a transverse section through a front wheel and steering knuckle.

Figure 2 is a view in elevation from the left of Figure 1 and partly broken away to show the brake shoe and drum annulus.

Referring by reference characters to the drawing, the invention is illustrated as used on a vehicle having a front driving axle 5 extending through an axle housing 7 relative to which a casing 9 rotates on a vertical axis or kingpin (not shown), the axis of rotation being indicated by line 11. Suitable means, not shown, are provided for turning part 9 about axis 11 for the purpose of steering. The casing 9 encloses a joint (not shown) between the drive shaft 5 and the wheel driving shaft 13 in the case of a front wheel drive. A non-rotatable axle 15 is secured by fastening means 17 to the casing 9 so that it swings with the casing as the latter is turned in steering. The wheel is composed of the usual three parts, a hub 19, a disc 21 and a rim portion 23 secured to the disc at 25 and carrying a rim 27. Roller bearings 29 support the wheel hub 19 on axle 15. Sealing means 31 are provided between the adjacent ends of the axle and wheel hub. Also the inner end of the wheel hub has a circular recess 33 to receive a projection 35 on the radial flanged part 37 of the axle 15.

A coupling disc 39 is mounted on the end of driving shaft 13 for rotation therewith as shown. To this coupling disc is secured by fastening means 41 a brake drum disc 43. The brake drum annulus is marked 45. It is preferably formed as a cast iron ring and the disc 43 is secured thereto in the process of casting in a well-known way. The drum annulus has radial extensions secured as at 47 to the wheel disc. Secured by fastening means 49 to the end of axle 15 is a plate 51 which serves the purpose of anchoring the shoes and carrying the brake applying means. The drawing shows brake shoes in the form of T-sections 53 carrying lining 55 adapted, when the shoes are spread, to frictionally contact the drum and retard its rotation.

It is intended that the shoe expanding means shall be of the hydraulic type. To that end a passage 57 is formed extending axially through the fixed axle 15 and a connecting radial passage 59 through a radially extended part of said axle as shown. A suitable coupling is shown at 61 for connecting the extremity of radial passage 59 with a conduit 63 forming a part of a conventional hydraulic brake system. Another coupling 65 is connected to the end of passage 57 and a conduit 67 from coupling 65 is adapted to extend to and be connected to a conventional wheel cylinder mounted on the anchor plate by any convenient fastening means (reference being made to Fig. 2). The drawing shows steady rests 69 to hold the shoes toward the anchor plate and away from the drum disc.

The advantages of the arrangement described will be obvious. When it is necessary to have access to the drum enclosure to replace or repair parts of the brake, bolts 41 and 47 are removed to permit the removal of the complete brake drum, disc 43 and ring 45. The wheel continues to support the load and easy access is had to the shoe assembly mounted on plate 51. That dirt and dust may not enter the drum enclosure will be seen from Fig. 1. Any foreign matter can enter the enclosure only after passing through the tortuous path defined by parts 33 and 35, through the inner seal 31, through the roller bearings 29 and then through the outer seal 31. This very effectively keeps foreign matter from the drum enclosure.

I claim:

1. In combination an axle having a horizontally disposed spindle and a flange normal to said spindle, a wheel having a hub rotatable about said axle, sealing means between adjacent inner and outer ends of said hub and axle, tongue and groove means on said hub and flange forming a circuitous path for air adjacent said inner seal, a brake drum attached to the outer face of said wheel, a closure member enclosing the end of said axle and forming, together with said wheel, an enclosure for brake mechanism.

2. In combination, an axle having a horizontally disposed spindle and a flange normal to said spindle, a wheel having a hub rotatable about said axle, sealing means between adjacent inner and outer ends of said hub and axle, tongue and groove means on said hub and flange respectively forming a circuitous path for air adjacent said inner seal, a brake drum removably secured to the outer face of said wheel, a closure disc constituting a part of said drum, said disc enclosing the end of said axle and forming, together with said wheel, an enclosure for brake mechanism.

3. The invention defined by claim 1, said axle being hollow and a driving shaft extending therethrough and terminally connected to said closure disc.

4. The invention defined by claim 1, said brake mechanism including shoes to engage said drum and hydraulic wheel cylinders, a plate secured to said axle and extending into said enclosure to support said brake mechanism, said axle having a passage for the flow of fluid to said wheel cylinders.

EARLE S. MacPHERSON.